United States Patent [19]

Leuthold et al.

[11] Patent Number: 5,977,674
[45] Date of Patent: Nov. 2, 1999

[54] SINGLE PLATE HYDRODYNAMIC BEARING WITH SELF-BALANCING FLUID LEVEL

[75] Inventors: Hans Leuthold; David John Jennings, both of Santa Cruz; Gunter Heine, Aptos; Lakshman Nagarathnam, Capitola, all of Calif.

[73] Assignee: Seagate Technology, Inc., Scotts Valley, Calif.

[21] Appl. No.: 08/955,428

[22] Filed: Oct. 21, 1997

Related U.S. Application Data

[63] Continuation of application No. 08/632,547, Apr. 15, 1996, abandoned, which is a continuation-in-part of application No. 08/279,199, Jul. 22, 1994, Pat. No. 5,533,812.

[51] Int. Cl.$^6$ ........................................... F16C 32/06
[52] U.S. Cl. ........................ 310/90; 360/98.07; 360/99.08
[58] Field of Search .................................. 310/67 R, 90.5, 310/90; 360/98.07, 99.08; 277/399, 400

[56] References Cited

U.S. PATENT DOCUMENTS 5,533,812   7/1996   Leuthold et al. ........................ 384/112

Primary Examiner—Thomas M. Dougherty
Attorney, Agent, or Firm—Flehr Hohbach Test Albritton & Herbert L.L.P.

[57] ABSTRACT

A thrust plate with grooved surfaces within a hydrodynamic bearing establishes pressure gradients which cause the lubricating fluid for the bearing to reliably remain within the region of the hydrodynamic bearing, with the pressure gradient imposed on the fluid causing the fluid to flow toward the center of the bearing rather than to be caused to be forced outward toward the far end of the bearing which could potentially result in a leakage of the fluid.

9 Claims, 5 Drawing Sheets

SINGLE PLATE HYDRODYNAMIC BEARING WITH SELF-BALANCING FLUID LEVEL

This is a continuation of application Ser. No. 08/632,547 filed Apr. 15, 1996 now abandoned which is a continuation-in-part of application Ser. No. 08/279,199 filed Jul. 22, 1994 now U.S. Pat. No. 5,533,812.

FIELD OF THE INVENTION

The present invention relates to the field of hydrodynamic bearing assemblies of the type which provide support and rotation for high speed spindle element. More specifically, the present invention relates to hydrodynamic bearing assemblies utilized in the computer disc drive recording system.

RELATED APPLICATIONS

This application is related to and may be used in common with the invention disclosed in A-59175 entitled "Device for Manufacturing a Groove Bearing", inventor: Clark et. al; A-59758 entitled "Squeeze Film Damping for a Hard Disc Drive", inventor: Jennings et. al; A-59757 entitled "Hub Disc Assembly With Integrated Air-bearing", inventor: H. Leuthold et. al; as well as A-59788 entitled "Single Plate Hydrodynamic Bearing With Fluid Circulation Path and Self-Balancing Fluid Level", inventor: Hans Leuthold et. al, all of said applications being assigned to the assignee of the present invention and incorporated herein by reference.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several short comings. First is the problem of vibration generated by the balls rolling on the raceways. Ball bearings used in hard disk drive spindles run under conditions that generally guarantee a physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the datatrack density and the overall performance of the disc drive system.

Another problem is related to the application of hard disk drives in portable computer equipment and the resulting requirements in shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

As an alternative to conventional ball bearing spindle systems, researchers have concentrated much of their efforts on developing a hydrodynamic bearing, In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid itself must be sealed within the bearing to avoid loss of lubricant which results in reduced bearing load capacity. Otherwise the physical surfaces of the spindle and housing would contact one another, leading to increased wear and eventual failure of the bearing system. Equally seriously, the failure of such a seal or other effort to contain the lubricant within the bearing system would cause the entry of contaminants into the head disc region of the disc drive.

Typically, in the prior art, seals for sealing the fluid within the disc drive utilize a pressurized film on the surface of the liquid air interface. In the case of bearing assemblies which employ ferro-magnetic fluids, the seal is achieved by the means of a magnetic field established at each end of the bearing. However, such seals have not been demonstrated to be reliably effective over a long period of time.

Other obvious short comings include the fact that many prior art hydrodyamic bearing assemblies frequently require large or bulky structural elements for supporting the axial and radial loads, as such hydrodynamic bearings do not have the inherent stiffness which results from mechanical bearing assemblies. It is difficult to scale the structural support elements to fit within the smaller disc drive dimensions currently in consumer demands. In other instances, hydrodynamic bearing assemblies suffer from the disadvantages of requiring extremely tight clearances and alignments; this burden makes it difficult to manufacture such assemblies since even a small deviation or aberration can lead to faulty bearings.

SUMMARY OF THE INVENTION

It is therefore an objective of the present invention to provide a hydrodynamic bearing which is extremely simple and highly scalable for use within an information storage unit such as a computer disc drive system. It is further a purpose of the present invention to provide a hydrodynamic bearing in which the possibility of the particles, droplets or outgassing from the hydrodynamic lubricating fluid to contaminate the inside of the hard disc drive is minimized. This invention is to alleviate the major concern in the design of a hydrodynamic hard disc drive spindle to make sure that the lubricant or fluid used stays in the motor.

In summary, the present invention utilizes a design combination of thrust plate journal with grooved surfaces within the bearing combination to set up pressure gradients which cause the fluid to reliably remain within the region of the hydrodynamic bearing, with the pressure gradient imposed on the fluid causing the fluid to flow toward the center of the bearing rather than to be caused to be forced outward toward the far end of the bearing which could potentially result in a leakage of the fluid to the interior of the hard disc drive.

Other features and advantages of the present invention will become apparent to a person of skill in the art who studies the following detailed description of a preferred embodiment given in conjunction with the accompanying drawings.

DETAILED DESCRIPTION OF A PREFERRED EMBODIMENT

A spindle motor and disc assembly for use in disc drive computer systems is disclosed herein. The special purpose of the present invention is to modify the design of a spindle motor incorporating a hydrodynamic bearing for the main rotating shaft for use in a hard disc drive application so that the lubrication fluid does not contaminate the inside of the hard disc drive with particles, droplets or outgassing. A major concern in the design of a hydrodynamic hard disc drive spindle is to make sure that the lubricant or fluid stays confined to the region where it lubricates the rotating surfaces, and cannot migrate toward the regions where the data storing discs are located.

Figure 1:
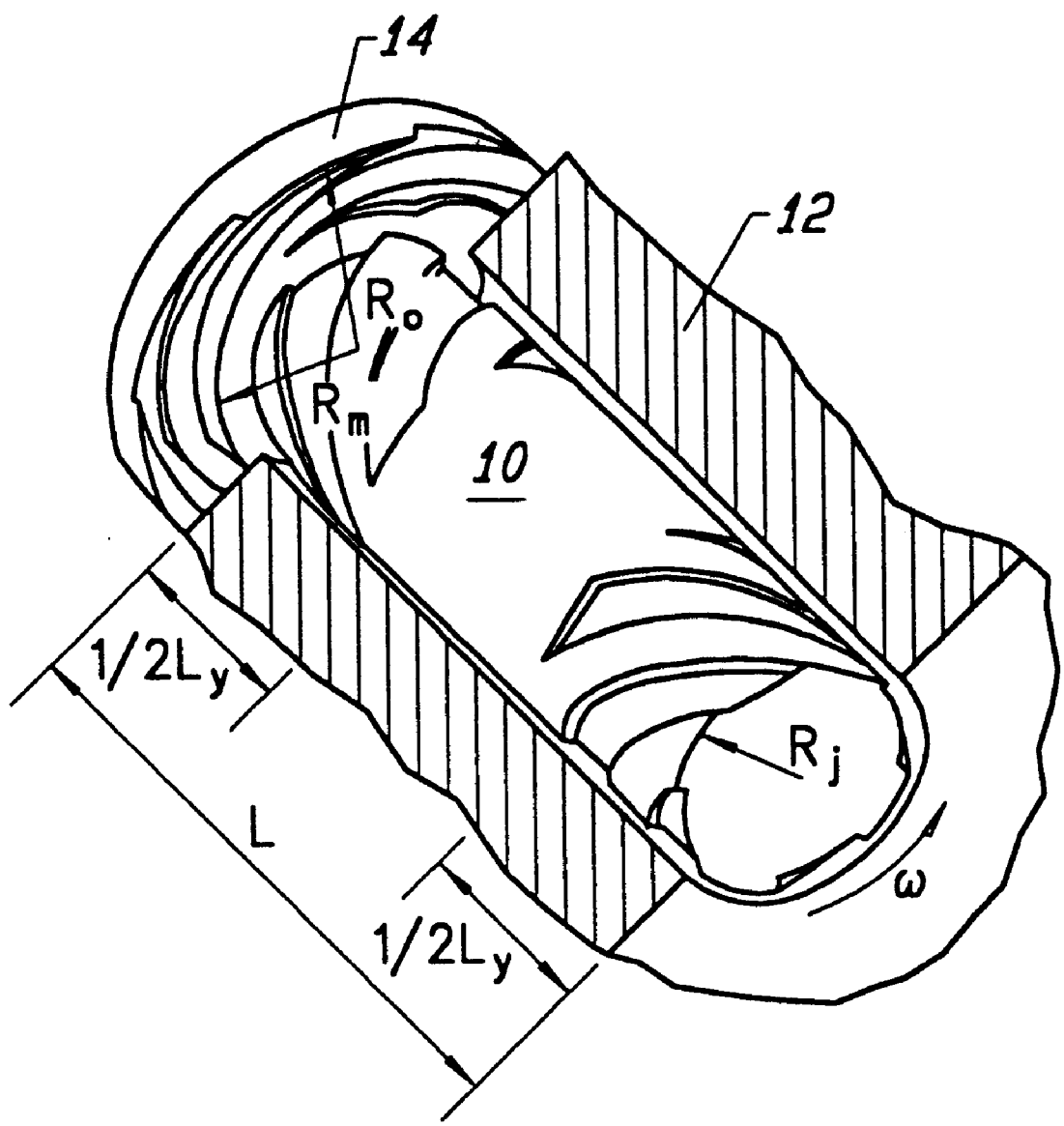
FIG. 1 is a top plan view of a disc drive in which the present invention is useful.

The basic principle of the present invention is based on a hydrodynamic bearing as already known in the technology, an example of which is shown in FIG. 1. As shown herein, a journal bearing built upon a shaft 10 rotating inside a bushing 12, one of the opposing two surfaces (in this case the shaft) carrying cylindrical sections of spiral grooves. A thrust plate 14 may also be provided with concentric spiral groove sections. The rotation of the shaft churns and pumps the fluid as a function of the direction, width, and angle of the grooves with respect to the sense of rotation. The pumping action builds up multiple pressure zones along the journal and the thrust plates, maintaining a fluid film between the rotating parts, and providing the stiffness of the bearing.

Obviously, with such rotation and pumping and churning of the fluid, the chance for fluid to spill out of the end of bearing is always present. This was the origin and impetus for the present invention.

Figure 2:
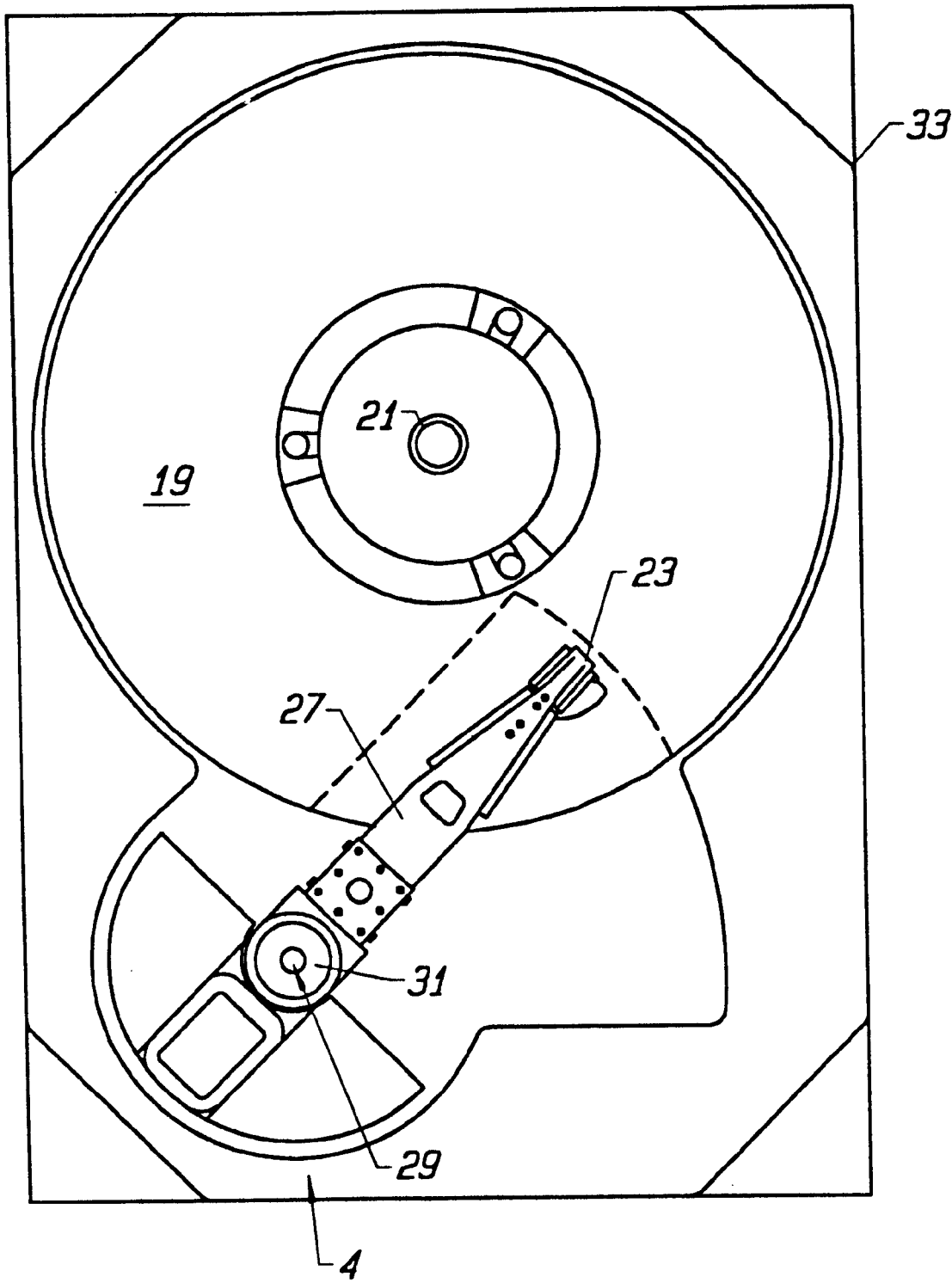
FIG. 2 is an illustration and embodiment which shows the basic principles of operation of a hydrodynamic bearing.

In the following description, numerous specific details are set forth such as material types, thickness, speeds in order to provide a thorough understanding of the invention. It will be obvious, however, to one of skill in the art that these specific details need not be used to practice the present invention. In other instances, well known structures and processing steps have not been described in particular detail in order to avoid unnecessarily obscuring the present invention. Thus, referring next to FIG. 2, this FIG. is a top plan view illustrating the basic element of a disc drive including the rotating disc or discs 19 which are rotated by the spindle 21 of a spindle motor (not shown). As the discs rotate, a transducer 23 mounted on the end of an actuator arm 27 is selectively positioned by a voice coil motor 29 rotating about a pivot 31 to move the transducer 23 from track to track over the surface of the disc. All of these elements are mounted in a housing 33 which is typically an air-tight housing to minimize the possibility of any contaminants reaching the surface of the disc. Such contaminants could interfere with the reading and writing of data on the surface of the disc by the transducer, the transducer itself having an extremely fine gap at which reading/writing occurs, and in today's technology flying extremely close to the surface of the disc. A typical spindle motor for providing constant high-speed rotation to the disc mounted thereon is shown in vertical section in FIG. 3.

This figure shows only a single disc 19 supported from the spindle or hub 19; obviously a significant number of discs could be supported from the hub of a motor of this type here. The figure is intended to show, for the sake of comparison, both the old and the new approach to bearing supports for a rotating shaft type of motor. Therefore, both the right and left hand portions of the figure show a magnet 24 supported on the interior vertical surface 28 of the hub 22 of the cavity defining hub element 30 a stator 26 is supported by the sleeve 40 which is adapted to be fitted into a base of the housing 34 at its lower end. On the right hand side standard mechanical bearings 44, 48 support the rotating shaft 52 for rotation about the central axis 52. Obviously the top horizontal portion of the hub 54 and the vertical disc supporting portion of the hub 30 rotate with this shaft. Meanwhile, the outer race 60 of each bearing supports the sleeve which in turn supports the stator on an external surface thereof. The energization of the stator to cause rotation of the hub by interaction of the stator with the magnet 24 is caused by controlled electrical signals provided on wires 62 to the coil windings.

Figure 3A:
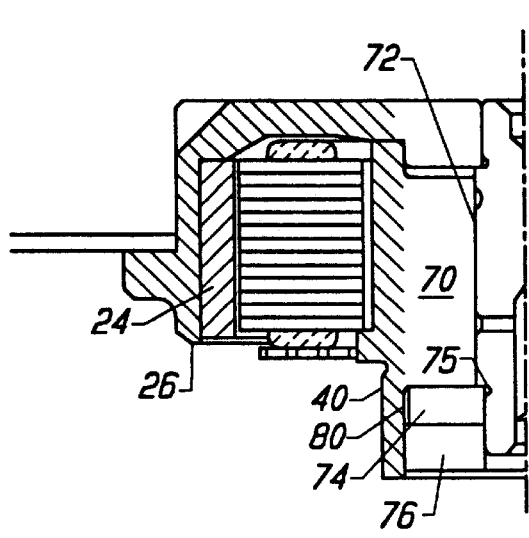
FIGS. 3A and 3B are vertical sectional views of a motor incorporating the hydrodynamic bearing of the present invention.
Figure 3B:
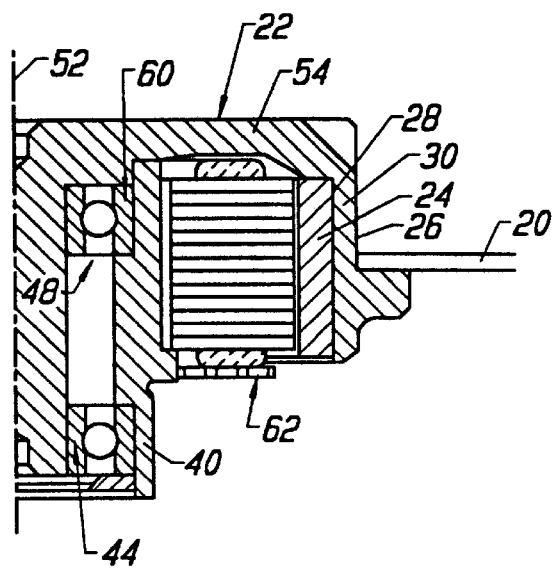

The left hand view of FIG. 3 shows the basic elements of the hydro-dynamic bearings of the present invention. In this case, rather than finding ball bearings 48 and 44 supporting the interior surface of the sleeve, the sleeve is a single solid piece 70 which on its interior surface 72 forms the bushing of the journal bearing. This bushing faces the shaft 52 which is rotating past the fixed bushing.

At the lower end of the rotating shaft near the base of the disc drive, a thrust plate 74 is stepped into the shaft at its upper end 76, and extends into a recess defined by the lower end of the bushing and the upper surface of counter-plate 76. This counterplate to the thrust plate 74 is pressed in place against the lower portion 71 of the sleeve, or sits against a step in the bushing in order to fix its position.

Figure 4A:
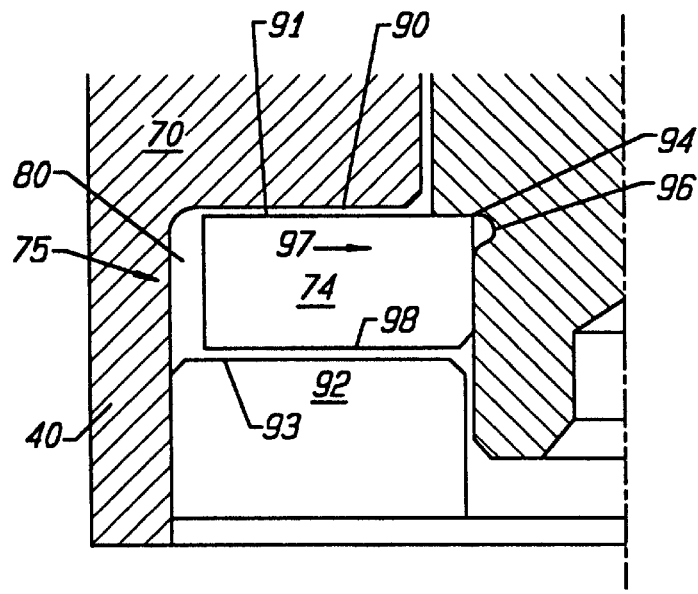
FIG. 4A is a detailed view of a section of hydrodynamic bearing of FIG. 3.
Figure 4B:
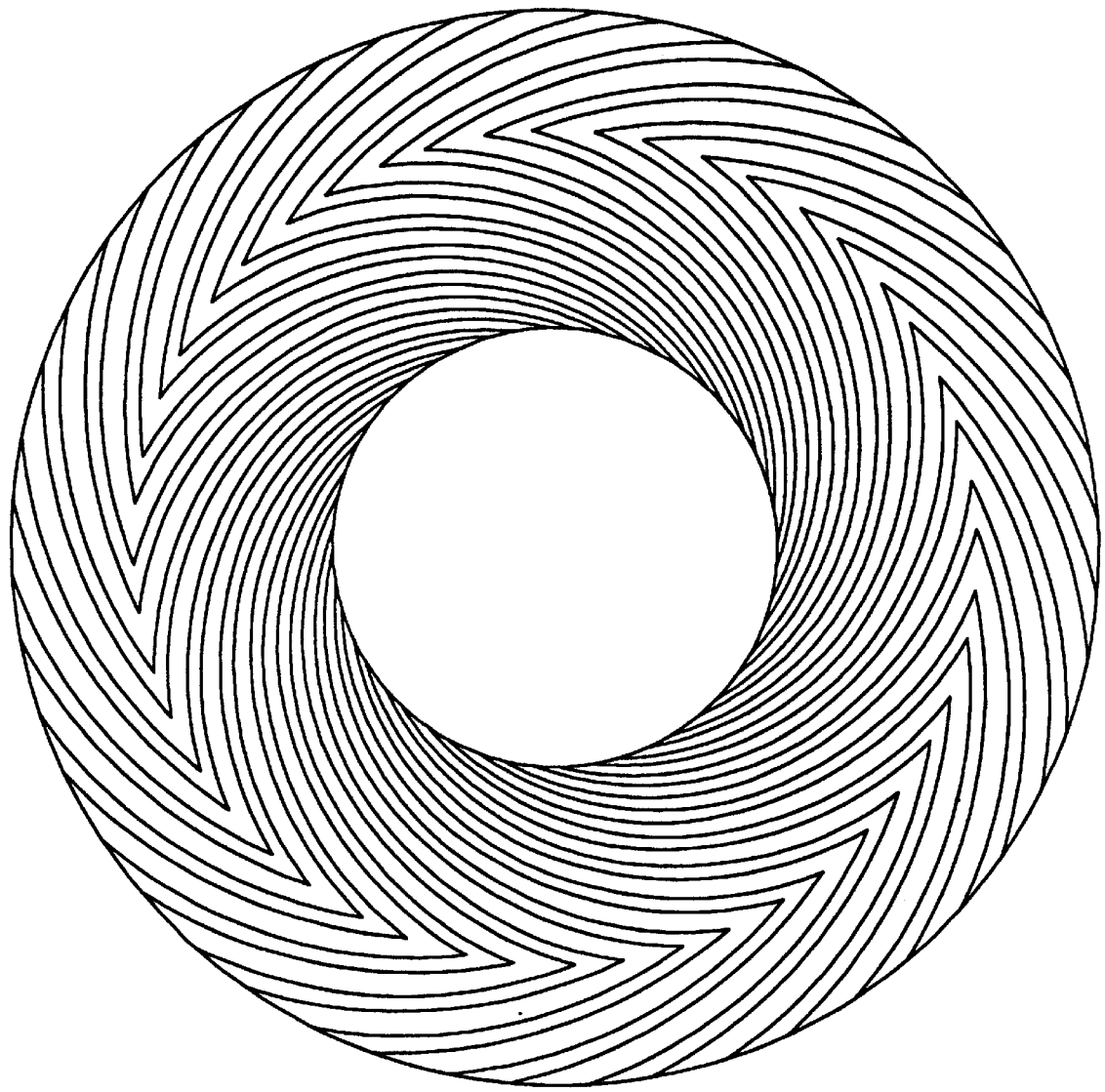
FIG. 4B is a plan view of a chevron design useful in the subject application.

Obviously, since the thrust plate 74 is rotating in the recess 80 defined by this bushing at its upper end the sleeve 71 to the side, and the counter plate 76 at the lower end, these positions must all be securely fixed as the gaps are very fine in order to promote the necessary fluid pressure flow between the surface of the thrust plate 74 which is rotating past the bushing. The details of the fluid distribution and specifically the fluid level balancing which is achieved by the present invention can best be appreciated by a review of FIGS. 4A and 4B and 5A and 5B. The lower thrust bearing 75 is shown in FIG. 4A. It includes a journal 74 that has no grooves positioned against a groove thrust plate 90, 92 sitting against a step 94 on the shaft. For the sake of this analysis, assume that a typical set of spiral type hydrodynamic bearing grooves as shown in FIG. 4B appear on each of the thrust plate surfaces 91, 93; the orientation of the apparent pattern being identical if one could see through the thrust plate. The thrustplate 74 is pressed against the shaft 94 which includes a small recess 96 to aid in fixing the thrustplate tightly in the corner of the shaft. The counter plate 76 is fixed against the bushing 70 and more particularly against the sleeve portion 40. Because of the arrangement with the upper surface 97 of the thrust plate being stepped back against the shaft, while the lower surface 98 is flat against the shaft, the net wetted surface of the upper portion of the thrust bearing (surfaces 91, 97) is less than the net wetted surface of the lower portion of the thrust bearing (surfaces 93, 98) assuming that the gaps are of equal size. This results in a net fluid flow which depends on the gap width of both bearings and indirectly on the thrust load. Assuming the gaps are the same width, the fluid flow will be upwardly away from the base of the shaft and disc drive and across the top of the upper thrust bearing toward the revolving shaft 52 and the point where the upper thrust bearing is stepped into that shaft.

Figure 5A:
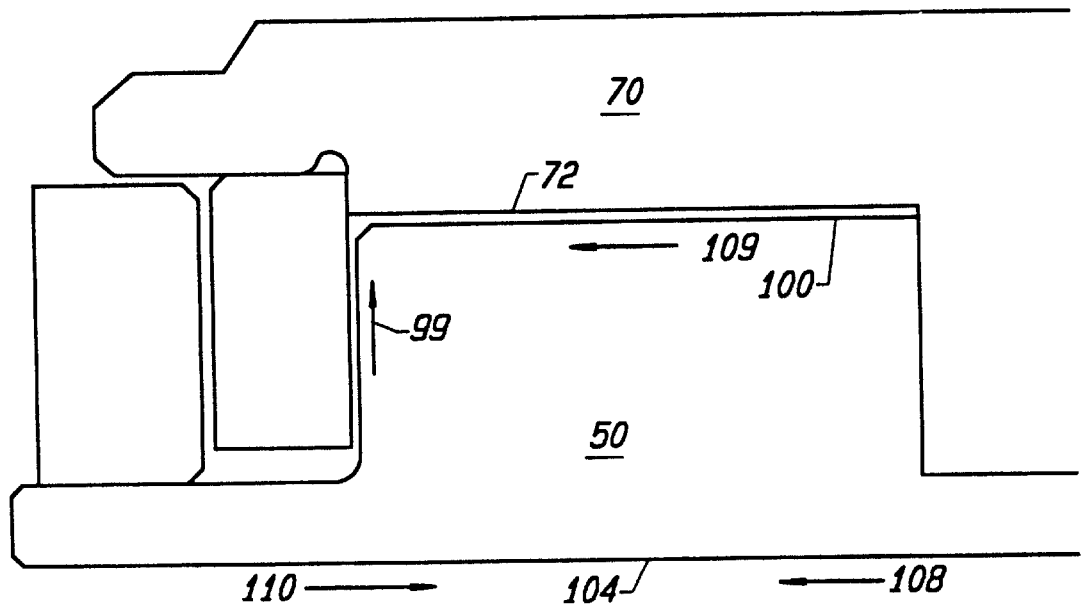
FIGS. 5A and 5B are further detailed sectional views of one of the thrust bearings in the hydrodynamic bearing of the present invention.
Figure 5B:
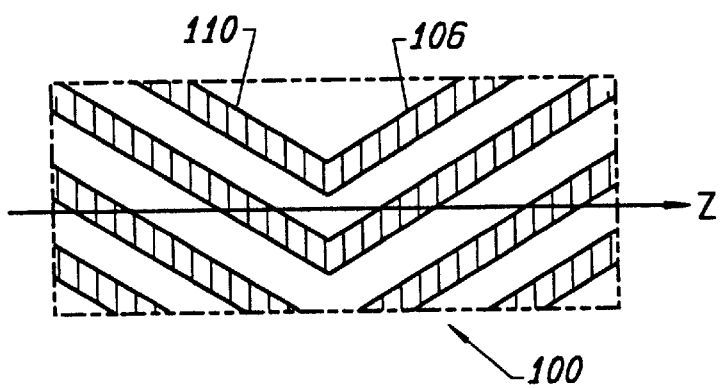

Turning next to FIGS. 5A and 5B, a journal bearing is shown including a bushing 70 having a plain surface 72, and a shaft 50 with multiple sections of spiral grooves on the surface 100. Alternate embodiments with grooves on bushing and plain shaft are possible without impeding on the behavior of the system. As shown in greater detail in FIG. 5B, the grooving pattern pressed or etched or burned into the journal surface is of a chevron design with the center line being offset toward the lower hydrodynamic bearing, the center line 104 separating a longer set of grooves 106 which have the effect of forcing fluid toward the lower thrust plate in the direction of arrow 108, and a shorter set of grooves 110 which have the effect of forcing fluid flow away from the lower thrust bearing. The difference in net apparent surface results in a net fluid flow in the direction of arrow 108 toward the lower hydrodynamic bearing.

Combining the effects described above with respect to the thrust bearing of FIGS. 4A and 4B with the effects of the journal bearing of FIGS. 5A and 5B, a net fluid flow in direction of arrow 108 is produced by the upper hydrodynamic bearing and a net fluid flow in the direction of arrow 97 is produced where by the lower hydrodynamic bearing. In steady state conditions the net fluid flow produced by the lower journal bearing in the direction of arrow 97 is constant and toward the upper journal bearing such that it tends to fill up the journal area between the rotating shaft or journal 50 and bushings 70 and maintain it filled. The net fluid flow created by the chevron pattern shown in FIG. 5B in the upper journal bearing depends on the difference in surface of the reversed grooving pattern covered by the fluid. Thus, if the journal-bushing gap is completely filled, the net flow is directed toward the lower bearing. The lower the fluid level measured from the lower thrust plate 90 along the journal 50, the smaller the net flow in the direction of the thrust plate. The combination of these effects results in a fluid level in the journal bushing gap which is balanced and stays contained in the bearing so that it is not thrown out of the bearing regardless of the speed of rotation of the rotating shaft 50 and the hub and discs.

Another important feature of the present inventive design is that it enables the necessary fluid to be inserted in the bearing without overfilling. With the present design, the assembler puts in 2–3 drops of fluid into the bearing, which drops wick into the bearing by gravity and capillary action. Then the motor is briefly spun to distribute the fluid evenly. This circulation typically removes all voids and bubbles in the fluid. Finally, another drop or two is added to complete the filling process, without overfilling which can result in spills or leakage.

Other alternatives such as variations in the chevron patterns or grooving patterns on both the lower thrust plate bearing and the upper journal bearing and in the relative lengths of the net wetted surfaces in each of the upper and lower bearings is possible without departing from the spirit and scope of the invention. Therefore, the scope of the present invention is to be limited only by the following claims.

What is claimed is:

1. A hydrodynamic bearing comprising a sleeve and a shaft rotating in an axial bushing of said sleeve, said shaft defining together with said bushing a journal bearing; an annular thrust plate extending axially from an end of said shaft, said thrust plate extending into a recess formed by an axial face of said sleeve and a counterplate parallel to said thrust plate and supported by said sleeve, and said axial face defining together with the adjacent thrust plate surface a first thrust bearing, and a gap between said thrust plate and said counterplate forming a second thrust bearing, said shaft including a reservoir having an open end facing said counterplate and a bore connecting said reservoir to said journal bearing, thus creating a fluid filled bearing system; said first thrust bearing and said second thrust bearing pumping in opposite directions but creating together a pressure difference pumping fluid towards said journal bearing and an open end of said bearing system, said journal bearing creating a pressure difference pumping fluid towards a closed end of said bearing system defined by said counterplate, the combined net fluid flow in said bearing system becoming zero under steady state conditions.

2. A hydrodynamic bearing as claimed in claim 1 wherein said sleeve is integral with said bushing facing said shaft or journal, said sleeve being adapted to be inserted in a base of an information storage system to support one or more discs for rotation within a housing of said hard disc drive.

3. A hydrodynamic bearing as claimed in claim 1 wherein said thrust plate of said thrust bearing is supported from said rotating shaft and projects into said annular recess, first and second surfaces of said annular thrust plate defining a gap with an axial face of said counter plate and said axial face of said sleeve, a distal end of said thrust plate forming a reservoir defined between said distal end of said thrust plate and said sleeve, so that said fluid flow is through said gaps defined between surfaces of said annular thrust plate and said counter plate surface and said axial surface of said sleeve.

4. A hydrodynamic bearing as claimed in claim 3 wherein each of said first and second surfaces of said annular thrust plate have patterns thereon for creating a fluid flow from said base of said shaft around said annular thrust plate and up toward said journal bearing of a spindle motor shaft.

5. A hydrodynamnic bearing as claimed in claim 4 wherein said annular thrust plate is mounted immediately beneath a stepped portion of said shaft so that said upper surface of said annular thrust plate has a less exposed surface than said lower surface of said thrust plate, said net exposed surfaces and said patterns cooperating to provide a net fluid flow through said first and second thrust bearings towards journal bearing.

6. A hydrodynamic bearing as claimed in claim 5 wherein said shaft includes a small recess at the interior upper extent of said step in said rotating shaft so that said annular thrust plate may be easily and reliably mounted under said step of said shaft.

7. A hydrodynamic bearing as claimed in claim 1 wherein said journal bearing includes a grooved pattern on said bore surface of said bushing facing said shafts said groove pattern for causing a net fluid flow toward said thrust bearing.

8. A hydrodynamic bearing as claimed in claim 7 wherein said grooving pattern comprises a series of v-shaped grooves on said bushing surface, the break point line of said grooves being closer to the end of said bushing near to said first and second thrust bearings than to another open end of said journal bearing.

9. A hydrodynamic bearing as claimed in claim 8 wherein said sleeve supporting a spindle is integral with said bushing facing said shaft or journal, said sleeve being adapted to be inserted in a base of said disc drive to support said discs for rotation within said housing of said hard disc drive.

* * * * *